United States Patent [19]

Zerinvary et al.

[11] Patent Number: 5,186,886

[45] Date of Patent: Feb. 16, 1993

[54] COMPOSITE NOZZLE ASSEMBLY FOR CONDUCTING A FLOW OF MOLTEN METAL IN AN ELECTROMAGNETIC VALVE

[75] Inventors: Miklos C. Zerinvary; Charles P. Nyilas, both of Monroeville, Pa.

[73] Assignee: Westinghouse Electric Corp., Pittsburgh, Pa.

[21] Appl. No.: 760,785

[22] Filed: Sep. 16, 1991

[51] Int. Cl.[5] .............................................. B22D 41/54
[52] U.S. Cl. .................................... 266/237; 222/591; 222/594
[58] Field of Search ............... 222/591, 600, 594, 597; 266/236, 237

[56] References Cited

U.S. PATENT DOCUMENTS

| | | | |
|---|---|---|---|
| 3,735,906 | 5/1973 | Zettlemoyer et al. | 222/567 |
| 4,324,266 | 4/1982 | Garnier et al. | 222/594 |
| 4,655,237 | 4/1987 | Gloor et al. | 266/237 |
| 4,805,669 | 2/1989 | Lillicrap | 137/827 |
| 4,842,170 | 6/1989 | Del Vecchio et al. | 266/237 |
| 4,888,313 | 12/1989 | Adams et al. | 501/103 |
| 4,897,112 | 1/1990 | Ekerot et al. | 266/237 |
| 4,928,933 | 5/1990 | Motomura | 266/237 |
| 4,951,929 | 8/1990 | Schwarz et al. | 222/591 |
| 4,961,455 | 10/1990 | Redemske et al. | 164/63 |

Primary Examiner—Scott Kastler

[57] ABSTRACT

A composite nozzle assembly for conducting a flow of molten steel in an electromagnetic valve is provided which comprises an inner nozzle shell formed from a ceramic material having high erosion-resistance but which undergoes internal tensile stresses of a magnitude sufficient to promote cracking when subjected to the thermal stresses caused by the flow of the molten metal, in combination with an outer nozzle shell that contains and closely engages the inner nozzle shell for applying a compressive load to the inner nozzle shell upon the initial flow of the molten metal through the shell in order to counteract the thermally induced tensile stresses and thereby prevent cracking. The outer nozzle shell is preferably formed from a ceramic material having superior thermal shock properties but yet which has a thermal coefficient of expansion about the same as that associated with the ceramic material forming the inner nozzle shell to minimize stresses at the interface of the inner and outer shells after thermal steady state has been attained. Additionally, the relative thickness of the outer nozzle shell is between about three and ten times that of the inner shell. In a preferred embodiment of the invention, the inner shell is formed from zirconia, while the outer shell is formed from boron nitride.

18 Claims, 8 Drawing Sheets

COMPOSITE NOZZLE ASSEMBLY FOR CONDUCTING A FLOW OF MOLTEN METAL IN AN ELECTROMAGNETIC VALVE

BACKGROUND OF THE INVENTION

This invention generally concerns ceramic nozzle assemblies, and is specifically concerned with a composite ceramic nozzle for conducting a flow of liquid steel in an electromagnetic valve.

Metering nozzles for controlling the flow of molten metals in metal casting processes are well known in the prior art. Such metering nozzles typically comprise a nozzle formed from a ceramic material that has an open end of a fixed size. The rate of flow through the nozzle is a function of the size of the opening and the height of the molten metal above it. When such nozzles are used in a steel casting process, the flow of metal through the nozzle is controlled by means of a copper chill plug. Specifically, a copper chill plug is engaged against the open end of the nozzle when the operator of the nozzle desires to stop the flow of metal therethrough. The copper chill plug locally "freezes" the molten metal within the nozzle opening, and causes a solid plug of metal to form within the nozzle which effectively supports the column of molten metal above it. To restart the flow, the operator lances the open end of the metering nozzle in order to melt the solid plug that was created by the application of the copper chill plug. Unfortunately, the use of such a lance can erode the ceramic material forming the nozzle thereby damaging it.

One of the most recent advances in molten metal flow control is the use of an electromagnetic coil formed around a ceramic nozzle. Such are known in the art as electromagnetic valves, and are capable of restarting a flow of molten metal by inductive heating without the use of a damaging lance. In addition to damage free restarting characteristics, such electromagnetic valves are well suited to modulate the flow of molten metal in both an open pour, or in higher quality casting practices which employ the use of inert gases over the molten metals during the casting process to protect the metals from atmospheric contaminants.

Unfortunately, the applicants have observed that the thermal properties of the ceramic materials typically used to construct the nozzles in such electromagnetic valves have significantly limited the usefulness of such valves. The preferred material for forming the metering nozzles in such valves is zirconia due to the extremely high erosion-resistant properties of this material. However, the advantageous erosion-resistive properties of zirconia is substantially negated by this material's tendency to crack when exposed to the thermal stresses associated with the stopping and starting of a flow of liquid metal through the nozzle. The applicants have observed that the unfortunate tendency for zirconia to crack under such thermal stress conditions is caused by the fact that zirconia's thermal coefficient of expansion sharply changes (i.e., decreases) at a temperature which is within the thermal gradient that the walls of the metering nozzle experience when molten metal initially flows over the inner walls of the nozzle. This abrupt change in the thermal coefficient of expansion creates tensile hoop stresses in the annular walls of the nozzle which are of a magnitude sufficient to create cracks within the walls of the nozzle which may propagate to the surface of the nozzle and thereby jeopardize the structural integrity of the nozzle walls.

While it may be possible to solve the cracking problem by increasing the thickness of the nozzle walls to an extent to where the tensile strength of the outermost portion of the walls was sufficient to counteract the tensile hoop stresses created by the thermal gradient, such wall-thickening would logarithmically reduce the efficacy of the induction coil in interacting with and melting the metal plug in the nozzle during a restart operation since field strength would decrease as a function of the square of the radial distance between the induction coil and the metal plug. Thus, considerably more electrical power would have to be used in the electromagnetic valve in order to melt the metal plug to restart a molten flow, which in turn would require thicker and more expensive coil windings. But even if the problem of lowered electromagnetic efficiency were not present, the mere thickening of the zirconia walls of the nozzle could well fail to solve the problem, since the temperature gradient imposed across even thickened walls could still cause at least microcracking to occur at the interface in the wall where the thermal coefficient of expansion of the material changed. If there were any faults in the grain structure of the zirconia forming the nozzle, these micro-cracks might form fissures which would propagate entirely through the wall thickness of the nozzle, thereby jeopardizing the integrity of the nozzle. While the nozzle could be formed from a ceramic material having better thermal shock properties (such as boron nitride), none of these ceramic materials has anywhere near the erosion-resistant properties of zirconia when exposed to an environment of molten steel. The much faster erosion of the internal surface of such a nozzle would make it difficult if not impossible to accurately modulate the flow through the valve during its operation, and would also necessitate frequent (and expensive) nozzle replacements.

Clearly, there is a need for a nozzle assembly for use within a metal casting electromagnetic valve which maintains all of the anti-erosion properties of zirconia, but which is not prone to cracking when exposed to the thermal shock which occurs when molten metal is initially conducted through the interior of the nozzle.

SUMMARY OF THE INVENTION

Generally speaking, the invention is a composite nozzle assembly for conducting a flow of molten metal, such as steel, in an electromagnetic valve which overcomes or at least ameliorates the shortcomings associated with the prior art. The composite nozzle assembly comprises an inner nozzle shell formed from an erosion-resistant ceramic material, such as zirconia, which undergoes tensile stresses of a magnitude sufficient to promote internal cracking when subjected to the thermal shock caused when said nozzle shell initially conducts the flow of liquid metal, in combination with a means for applying a compressive load to the inner nozzle shell for reducing the internal tensile stresses caused by such thermal shock. The compressive means includes a layer of electrically non-conductive material disposed around the outside of the inner nozzle shell which is preferably capable of applying both circumferentially and axially oriented compressive forces when the nozzle shell initially conducts a flow of liquid metal, but yet which will not significantly interfere with the electromagnetic field employed by the electromagnetic valve to control the flow of molten metal through the nozzle assembly.

In the preferred embodiment, the compressive force means includes an outer nozzle shell that contains and closely engages the inner nozzle shell and which is formed from a second ceramic material having both superior thermal shock properties than the first ceramic material, as well as a thermal coefficient of expansion about the same as that associated with the first ceramic material in order to minimize stresses at the interface of the inner and outer shells after thermal steady state has been attained. An example of a material which may form the outer nozzle shell is boron nitride.

Additionally, in order to provide the resulting composite nozzle assembly with the greatest amount of tensile strength to counteract the tensile stresses generated by the zirconia inner nozzle shell when molten metal initially flows through this shell, the outer nozzle shell is between three and ten times thicker than the inner nozzle shell. Such relative dimensioning of the wall thicknesses of the outer and inner shell further has the advantageous effect of minimizing the thermal gradient experienced by the inner nozzle shell, since the closer that the inner and outer diameters of the inner nozzle shell become, the faster heat is conducted therethrough.

In an alternate embodiment of the invention, the compressive force means is a strip of flexible, heat resistant fabric tensionally wrapped around the exterior of the inner nozzle shell in order to apply a compressive force of between 15 and 30 ksi. This strip of material is preferably helically wound around the exterior of the internal nozzle shell so that compressive forces in both the circumferential and axial directions are applied. In this particular embodiment of the invention, a layer of heat-resistant mortar is preferably further applied over the layer of flexible, heat resistant fabric (which may be formed from fiberglass or mineral fibers) in order to maintain the tensionally wrapped strip of material in place around the surface of the inner nozzle shell.

The composite nozzle assembly of the invention provides a long lasting, thin-walled and erosion-resistant nozzle ideally suited for use within an electromagnetic valve which not only roduocs the amount of electrical power necessary to operate the valve, but which further provides sound, double-walled protection against an accidental spillage of molten steel should a fracture occur in the material forming the nozzle surface.

BRIEF DESCRIPTION OF THE DRAWINGS

FIG. 3 is a cross-sectional side view of the type of electromagnetic valve that the metering nozzle of the invention is best adapted for use in;

DETAILED DESCRIPTION OF THE INVENTION

Figure 1:
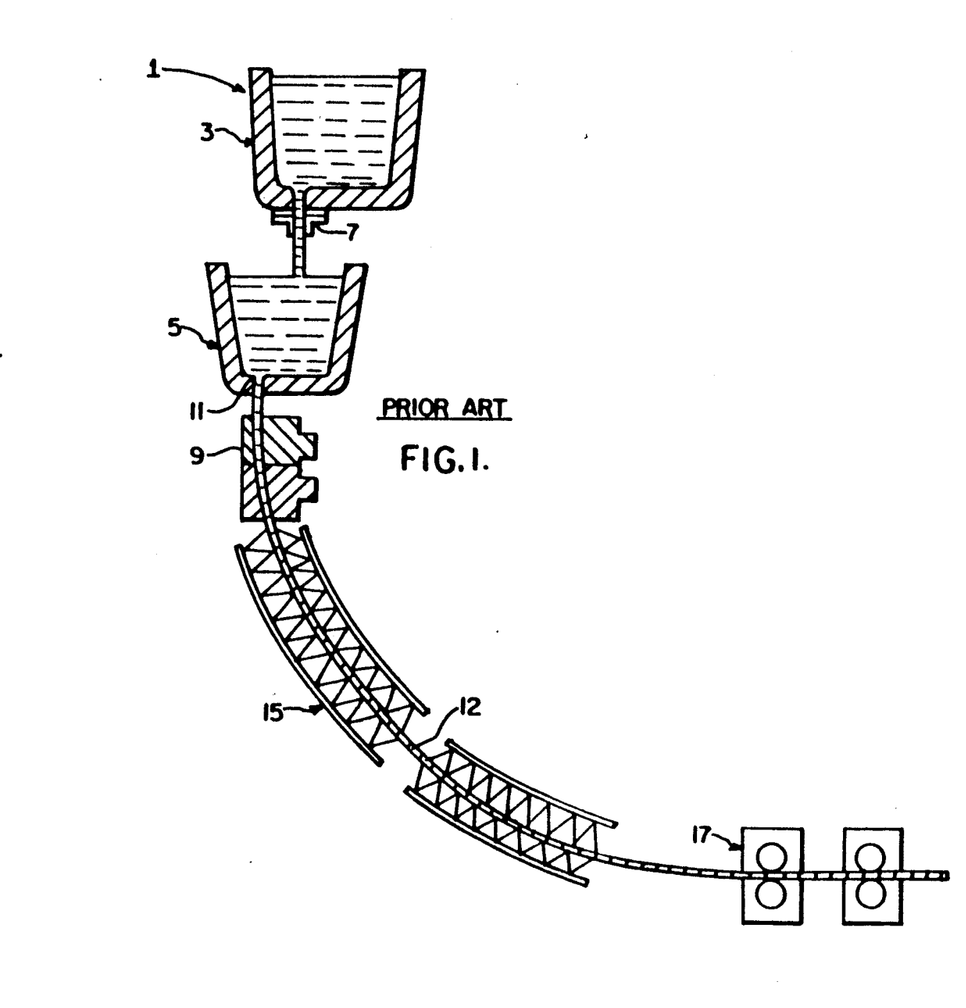
FIG. 1 is a schematic diagram of a continuous casting system, illustrating where metering nozzles are used in such systems.

FIG. 1 schematically illustrates the kind of continuous casting system that the composite nozzle assembly of the invention is best adapted for use in. Such a system 1 includes a ladle container 3 for holding molten steel which is disposed above a tundish 5. A slide gate assembly 7 located at the bottom of the ladle container 3 allows the container 3 to intermittently fill the tundish 5 with molten steel. The tundish 5 in turn continuously pours molten steel into a mold 9 by means of a number of metering nozzles 11 located at its bottom, of which only one is shown. The purpose of the metering nozzle 11 is to pour molten steel into the mold 9 at exactly the same rate that the system 1 is able to chill the molten steel into the steel bar 12 shown in the Figure. Therefore it is required that the bore sizes of each of the metering nozzles 11 be uniform in size. The height of the molten steel in tundish 5 is used to modulate the flow of molten steel through the metering nozzle 11. The system 1 further includes a spray assembly 15 for cooling the newly-cast steel bars 12 that continuously exit from the bottom of the mold 9, as well as a straightener assembly 17.

Figure 2:
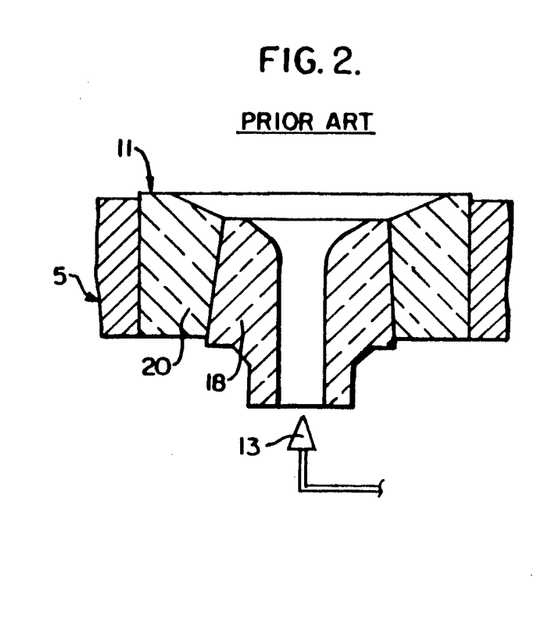
FIG. 2 is an enlargement of the circled area in FIG. 1 illustrating a cross-sectional side view of a prior art metering nozzle.

With reference now to FIG. 2, prior art metering nozzles 11 generally comprise a nozzle shell 18 formed from high density zirconia which is in turn circumscribed by a well block 20 formed from low density alumina. Control of the flow of molten steel through the metering nozzle shell 18 is accomplished by movement of the copper chill plug 13 in the manner previously described. While metering nozzles of the type illustrated in FIG. 2 are capable of providing the kind of uniform flow necessary in a continuous casting system 1, they are not without shortcomings. Specifically, when it is necessary to shut the flow of molten steel completely off through such metering nozzles 11, the copper chill plug 13 is inserted into the bottom of the nozzle bore until the molten steel is locally frozen into a solid plug of steel within the shell 18. To restart the flow, it is necessary to manually lance the solid plug of steel disposed within the inner diameter of the nozzle shell 18 until the steel forming this plug is returned to a molten state. Such a lancing procedure is not only time consuming (and hence costly in terms of lost production time), but erosively damaging to the ceramic material forming the bore of the metering nozzle 11, and thus jeopardizes continued uniform flows of metal in the continuous casting system 1 operation.

Figure 3:
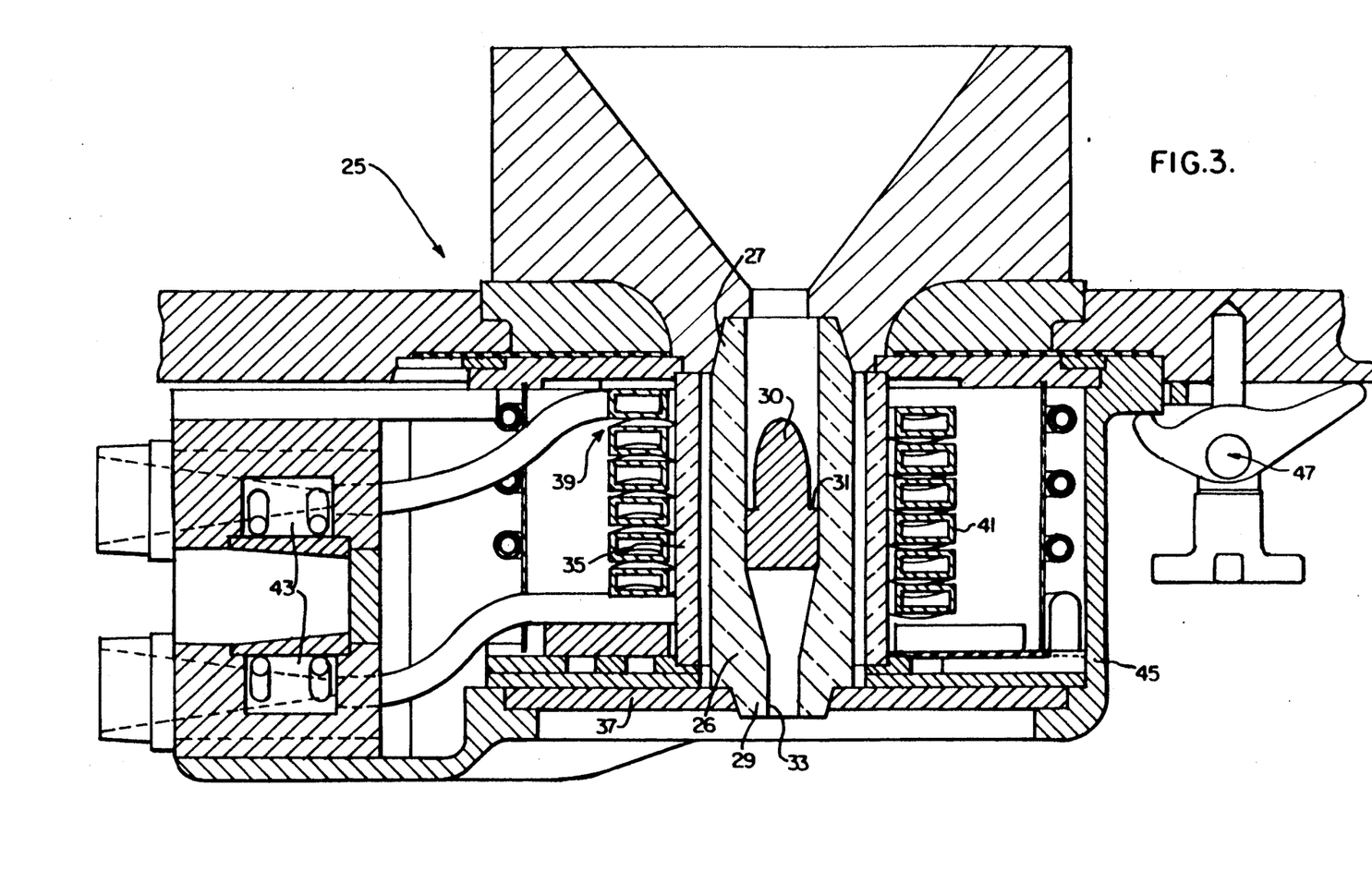

The shortcomings associated with the prior art metering nozzle 11 illustrated in FIG. 2 inspired the development of the electromagnetic valve 25 illustrated in cross-section in FIG. 3. Such electromagnetic valves include a nozzle shell 26 which, while likewise formed of the same zirconia material associated with prior art metering nozzles 11, is cast into a different shape. Specifically the nozzle shell 26 includes a tapered top 27 which is mortared-sealed to a funnel-shaped well block 28. The nozzle shell 26 further includes a tapered bottom 29, as well as a torpedo structure 30 disposed within its inner diameter. This torpedo structure 30 is supported within the inner diameter by means of four fins 31 (of which only two are shown) which define four, arcuate flow paths between the body of the torpedo structure 30 and the inner diameter of the nozzle shell 26. The outlet 33 of the nozzle shell 26 is circumscribed by the tapered bottom 29 as shown. The outer walls of the nozzle shell 26 are surrounded by a cylindrical alumina safety liner 35, while the tapered body 29 of the shell 26 extends through an aperture in a steel support plate 37 which functions to support the nozzle shell 26 within the valve 25.

In lieu of the difficult molten steel level control in the tundish 5 used to modulate the flow of molten steel through the prior art metering nozzle 11, the electromagnetic valve 25 includes an induction coil 39 having a spiral-shaped portion 41 which closely circumscribes the alumina safety liner 35 surrounding the nozzle shell 26. The spiral portion 41 terminates in a pair of leads 43 which are ultimately connected to a source of electrical power (not shown). The entire valve is contained within a bucket-shaped alumina housing 45 which is attached to the bottom wall of a tundish 5 by means of three support clamps 47 (of which only one is shown). In operation, the flow of molten steel through the four, arcuate flow paths defined between the fins 31 of the torpedo 30 and the inner diameter of the nozzle shell 26 is controlled by the magnetic field generated by the induction coil 39. In theory, the coil 39 can conduct a current powerful enough to generate a field which is capable of completely stopping the flow of molten steel through the nozzle 26. The energy generated, however, would vaporize the steel. Therefore the above described practice of stopping the flow of molten metal via a copper chill plug 13 is adapted for the electromagnetic valve 25. Restarting of the flow is accomplished in a few seconds by inductive heating and without the damage caused by lancing. Accordingly, such electromagnetic valves 25 eliminate the need for lancing whenever it is necessary to stop the flow of molten steel through the nozzle shell 26. Additionally, the use of a magnetic field in lieu of controlling the level of the molten metal in the tundish 5 results in a more accurate modulation of the flow of molten steel through the nozzle shell 26, thereby improving the operation of the entire continuous casting system 1.

While electromagnetic valves 25 constitute a major advance in the art of modulating the flow of molten steel in a continuous casting system, such valves 25 are not entirely free from other operational problems. Specifically, the applicant has noted that the relatively thinner walls of the zirconia nozzle shell 26 tend to develop cracking as a result of thermal shock when molten steel is initially poured through the inner diameter of such a shell 27. One proposed solution to the problem has been to thicken the walls of the nozzle shell 26 until they approximate the wall portions associated with prior art metering nozzles 11. However, such a solution would necessitate an increase in the diameter of the spiral portion 41 of the induction coil 39 which in turn would weaken the strength of the magnetic field generated by the coil by an amount proportional to the square of the increase in the radius of the coil. While the relatively weaker magnetic field could be compensated for by thickening the cross-sectional area of the copper conductor forming the coil 39, and further by conducting more current through the coil, such a solution would considerably increase the expense of manufacturing and operating the electromagnetic valve 25. Another proposed solution has been to replace the zirconia that normally forms the shells of such metering nozzles with a ceramic material which is less prone to crack when subjected to thermal shock. However, no other known, commercially-practical ceramic material has the erosion-resistant properties that zirconia has with respect to flowing molten steel. Consequently, if the nozzle shell 26 were formed from an alternate ceramic material with less erosion-resistance, the accurate modulation of the steel flow would become much more difficult as the arcuate flow paths between the torpedo fins 31 and the inner diameter of the nozzle shell 26 became wider with age. Additionally, the lower erosion-resistance of such a nozzle shell would necessitate more frequent replacement, which would be expensive not only in terms of replacement shells, but in the amount of system down-time necessary to implement such a replacement. For all these reasons, the applicant decided to solve the problem of nozzle shell cracking not by thickening the walls or making the nozzle shell out of a different ceramic material, but rather by ascertaining the fundamental cause of the cracking, and eliminating it.

Figure 4:
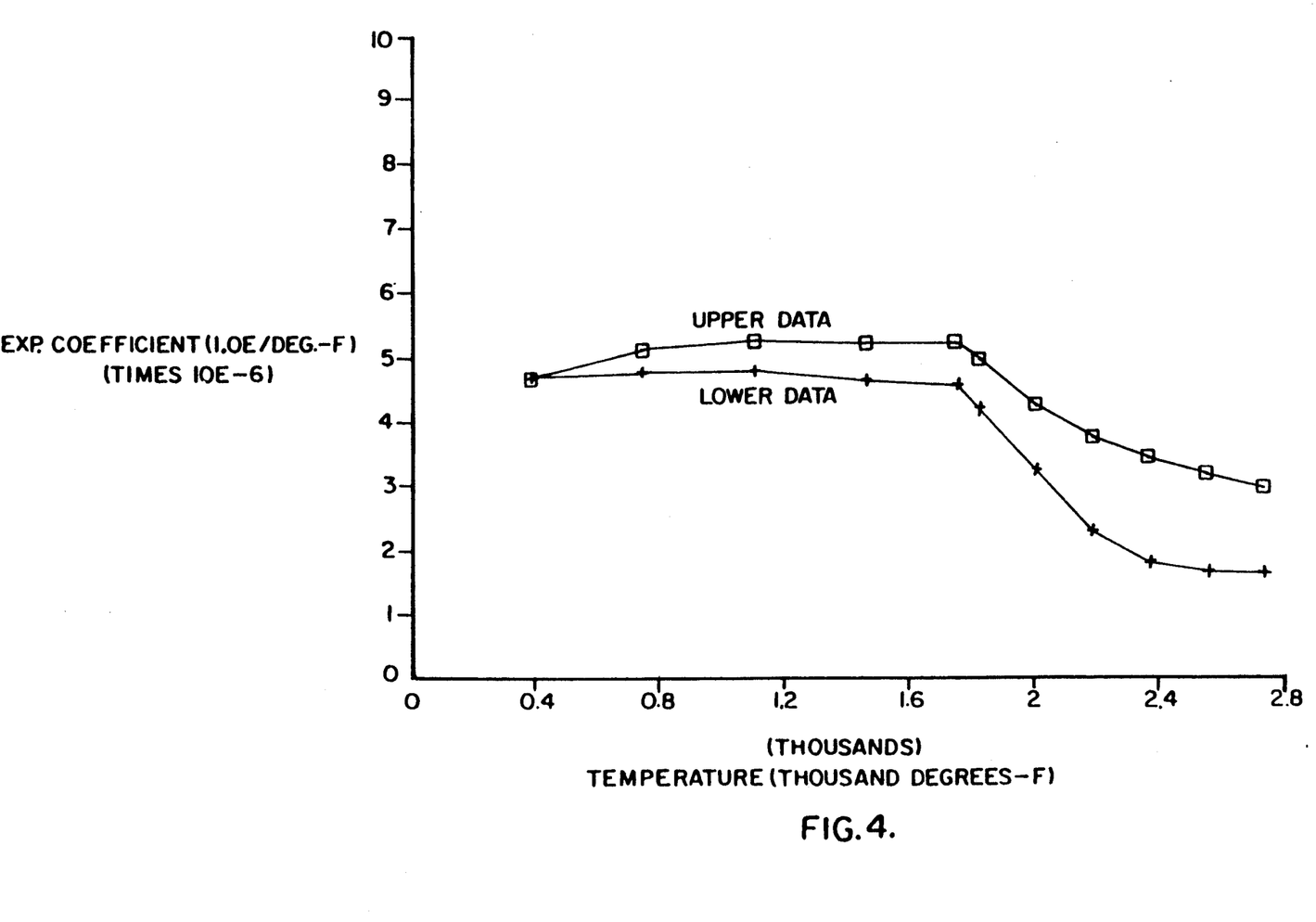
FIG. 4 is a graph illustrating both how the expansion coefficient of the zirconia that forms the inner nozzle shell of the nozzle assembly varies with temperature, as well as the extent to which the expansion coefficient can vary between different samples of zirconia.
Figure 5:
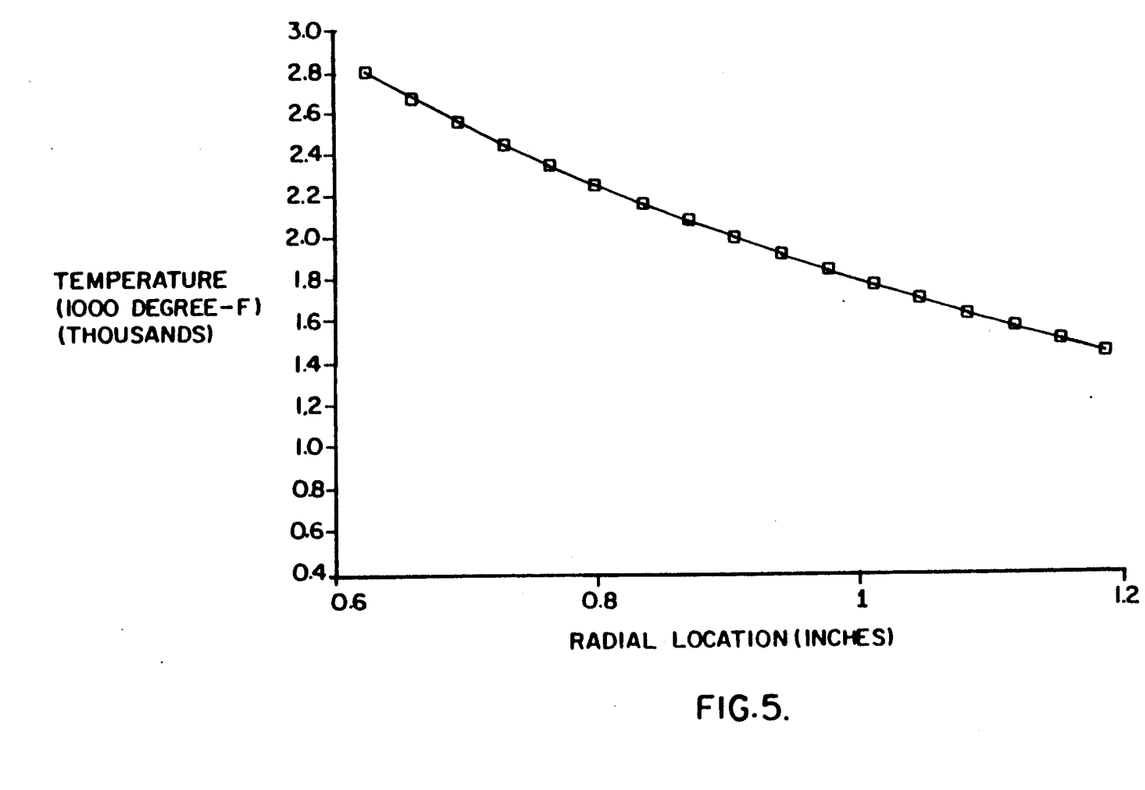
FIG. 5 illustrates how the temperature varies with the radial position along the line A—A drawn across the wall thickness of the inner nozzle shell illustrated in FIG. 6.
Figure 6:
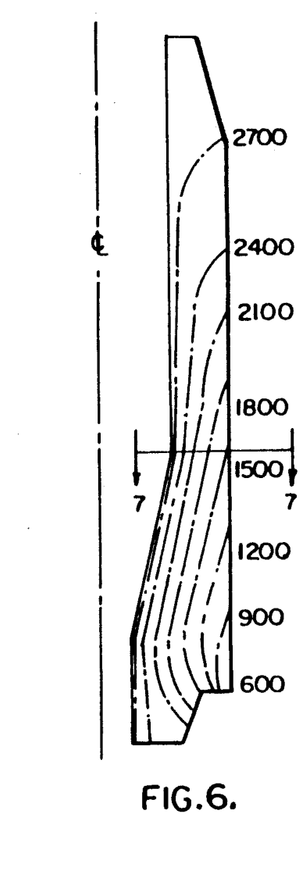
FIG. 6 is a cross-sectional side view of a state-of-the-art (single material) nozzle shell used is an electromagnetic valve, illustrating by way of a family of isothermic curves the temperature distribution through the walls of the nozzle shell when the nozzle is used to conduct molten steel.

FIGS. 4, 5 and 6 represent data which indicate the cause of the cracking problem. FIG 4 is a graph illustrating how the thermal coefficient of expansion of the zirconia forming a nozzle shell varies as a function of temperature. The data represented in this graph indicate that the coefficient of expansion of zirconia is substantially constant for temperatures above ambient up until about 1800° F., whereupon the coefficient of expansion actually becomes smaller up until approximately 2800°, which is the temperature of molten steel. The two curves in this graph were generated from a multiplicity of sample points involving a number of different samples of zirconia, and the applicants surprisingly discovered in the course of their studies that while the coefficient of expansion does indeed change sharply at or around 1800° F. for all the zirconia samples tested, that the coefficient of thermal expansion was further substantially different in different types of zirconia. The upper curve in the graph of FIG. 4 was generated by drawing a line through all of the upper values of the thermal expansion coefficients measured in the various samples, while the lower curve was generated in the same way with all of the lower values found. The variation between the thermal coefficient of expansion appears to be at its most severe at approximately 2400° F., where the lowest expansion coefficient amounted to 1.8, and the highest coefficient amounted to approximately 3.75. The data represented in FIG. 5 indicate that any universal solution to the cracking problem would have to take into account not only the fact that the thermal coefficient of expansion of zirconia changes significantly at temperatures of 1800° and beyond, but that the absolute value of this coefficient varies substantially between different samples of zirconia.

FIGS. 5 and 6 illustrate the temperature gradient from the inner to the outer wall of the nozzle shell across the line A—A in FIG. 6 after thermal steady-state has been reached within the nozzle shell. Specifically, the right-hand side of the graph shows that the inner wall of the nozzle shell is approximately the same temperature as the molten steel which flows through it (i.e., about 2800° F.), while the outer wall of the nozzle shell arrives at a temperature of about 1,200° at thermal equilibrium. At startup, the thermal gradient is of course at its most severe, since the inner wall of the nozzle shell will be immediately subjected to a temperature of 2800° as the molten steel first runs over it while the outer wall will be very close to ambient temperature. In all cases, it should be noted that the thermal gradient across the walls of a nozzle shell having the shape and dimensions of the shells used in electromagnetic valves 25 will include the 1800° F. transition point at which the thermal coefficient of expansion changes in zirconia.

Figure 7:
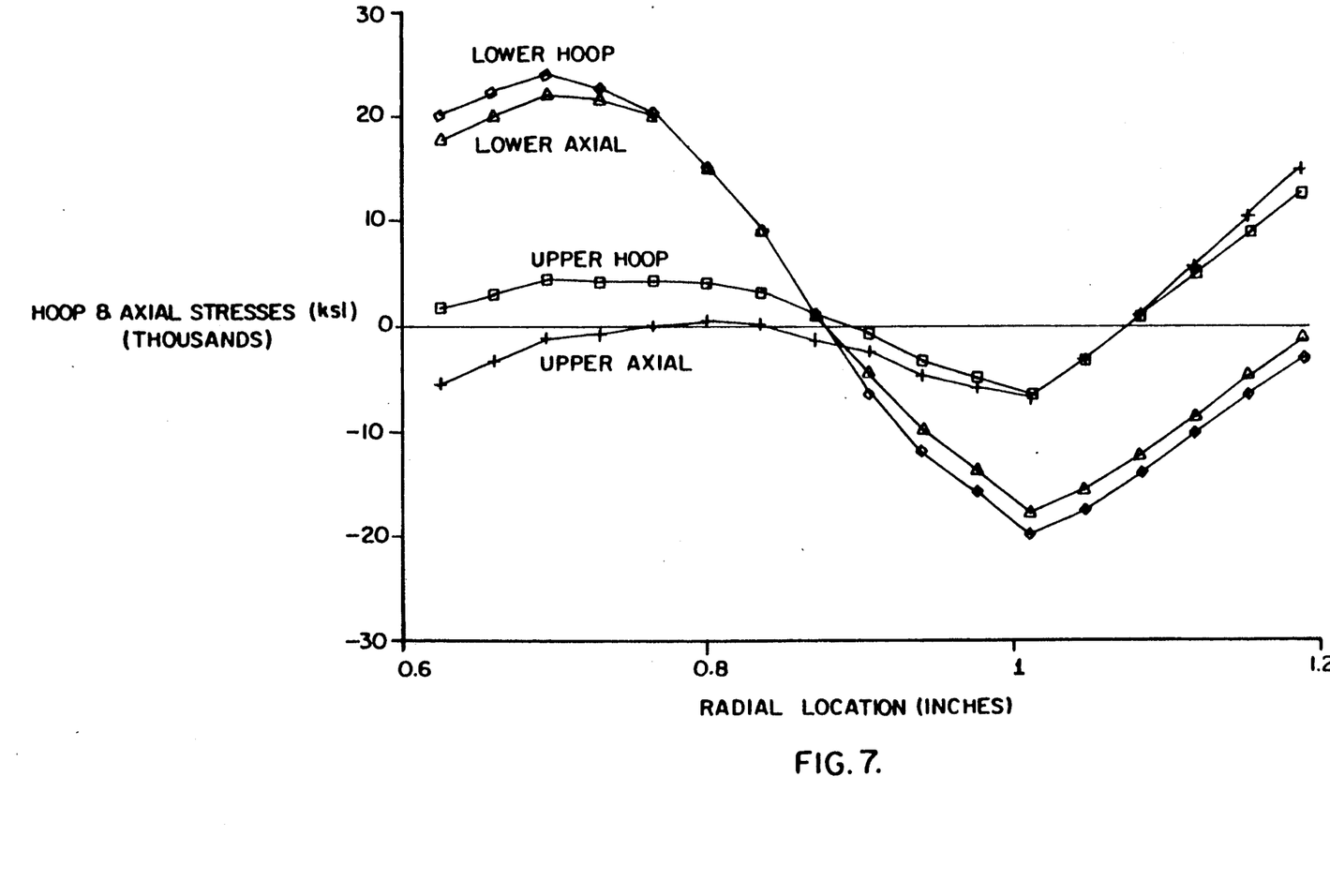
FIG. 7 is a graph illustrating the hoop and axial stress distribution along the line A—A of the nozzle shell illustrated in FIG. 6 for both the upper and lower thermal expansion coefficients illustrated in FIG. 4.

FIG. 7 illustrates both the hoop stresses and the axial stresses generated in the nozzle 26 illustrated in FIG. 6 after thermal steady state has been attained in an electromagnetic valve 25 operating with molten steel flowing through the zirconia nozzle 26 at 2800° F. for both the upper and lower values of the thermal coefficient of expansion, whose values were ascertained in the graphs in FIG. 4. The vertical axis of this group represents stress in ksi, while the horizontal axis represents the radial location of the stress along line A—A in FIG. 6. The curve generated by the diamond-shaped data points represents the hoop stresses present within a nozzle shell shaped as shown in FIG. 6 for the lowermost values of the thermal coefficient of expansion, while the curve generated by the squares indicates these same hoop stresses for the upper values of the coefficient of expansion. Similarly, the curve generated by the triangular data points represents the stresses of the nozzle shell illustrated in FIG. 6 along the vertical axis for the lower values of the coefficient of thermal expansion, while the curve generated by the crosses illustrates these axial stresses for the upper values of the thermal coefficient of expansion. Regardless of what specific values of the thermal coefficient of expansion are used, it is clear that the abrupt change in the thermal expansion coefficient which is present in all zirconia at around 1800° F. creates a severe inflection in the stress curves and accompanying values which are at least on the order of about 17 ksi somewhere within the walls of the nozzle shell at thermal steady state.

Figure 8:
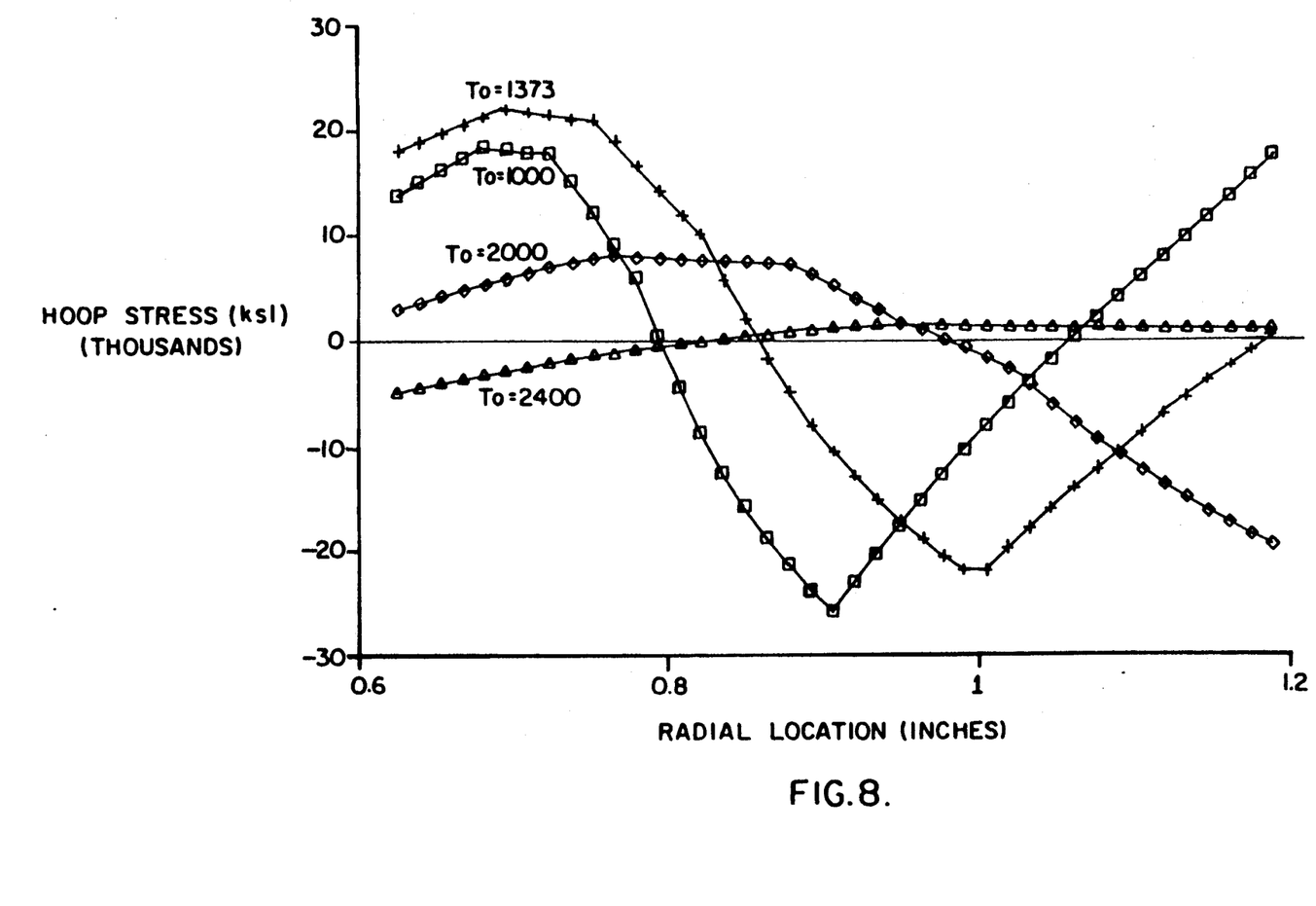
FIG. 8 is a graph illustrating how hoop stress varies with the radial location along the line A—A of the shell wall illustrated in FIG. 6 for the lower expansion coefficient data for four different temperature differentials between the inner and outer wall surfaces of the nozzle shell.
Figure 9:
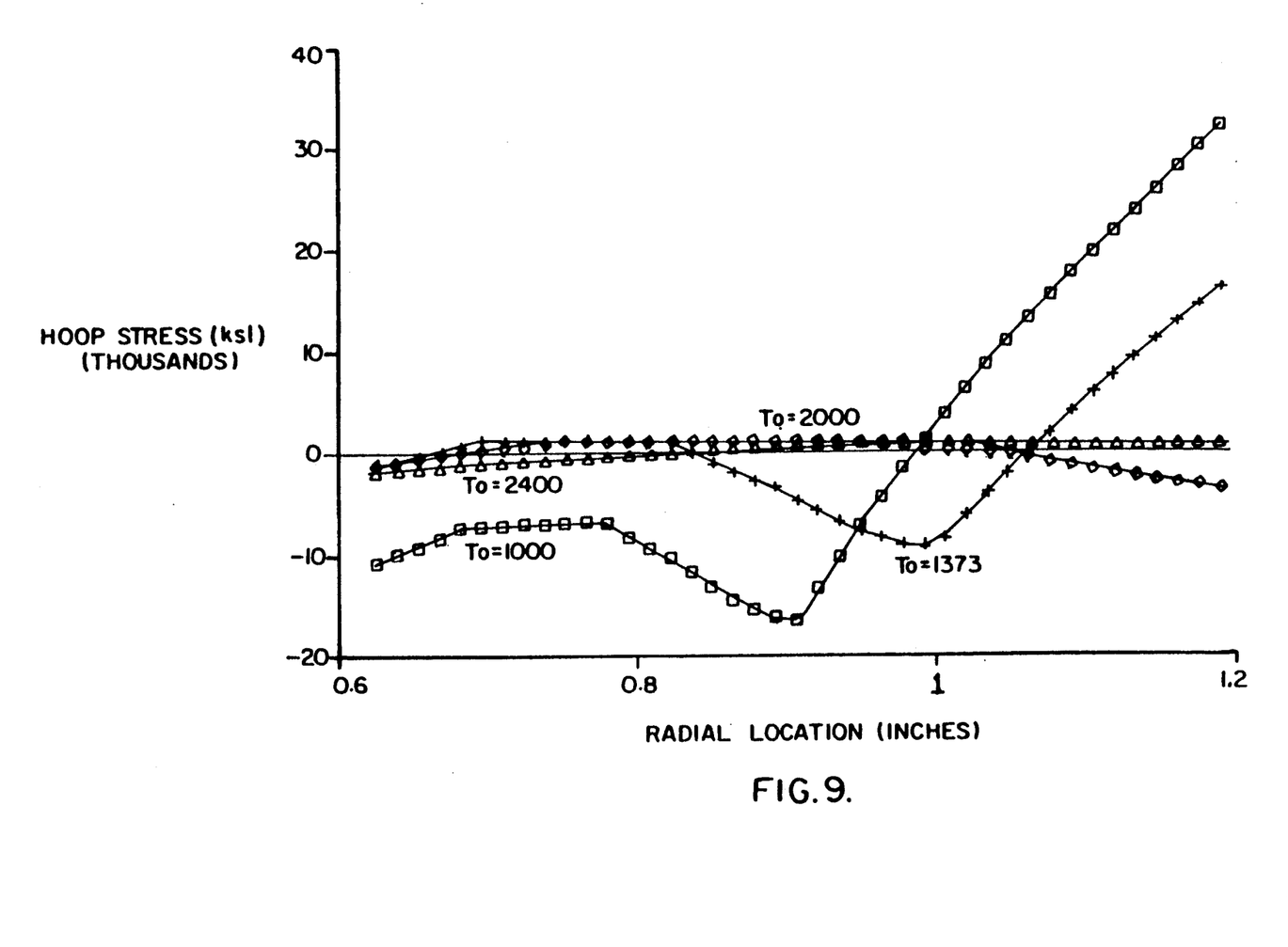
FIG. 9 also illustrates how hoop stress varies with radial location along the line A—A in FIG. 6 for the upper expansion coefficient data illustrated in FIG. 4 for the same four temperature differentials referred to with respect to FIG. 8.

These stresses are, of course, more severe when molten steel initially runs through the inner diameter of the nozzle shell, and these more severe stresses are illustrated in FIGS. 8 and 9.

Specifically, in FIG. 8, the hoop stresses (in ksi) are plotted for four different gradients, including the gradient existing when the outer wall of the nozzle shell is heated to 1000° F., 1370° F., 2000° F. and 2400° F. (represented by the square data points, the X data points, the diamond-shaped data points and triangular data points, respectively) for the lower coefficient of expansion data. Of course, the temperature of the inner wall of the nozzle shell is always at 2800° F., which is the temperature of molten steel. As is clearly evident from the curve plotted from the square data points (where the outer temperature of the nozzle is only at 1000° F.), the hoop stresses are quite severe at points at about 0.7 and 0.9 inches along the line A—A in FIG. 6, being on the order of about 19 ksi tension and 28 ksi compression, respectively. While these hoop stresses would abate substantially if the temperature of the outer wall of the nozzle could be made to be 2000° F. or higher, this would not occur without auxiliary heating, as the temperature of the outer wall at steady state rises to a maximum of about 1500° F. Hence the hoop stresses remain at very high levels and never abate to insignificant levels even after thermal steady state has been attained.

FIG. 9 illustrates the hoop stresses within the walls of the nozzle shell as a function of radial location for the same four thermal gradients present in FIG. 8 (i.e., for an outer wall temperature of 1000°, 1373° F., 2000° F., and 2400° F. represented by squares, crosses, diamonds and triangles, respectively) for the upper coefficient of expansion data. Interestingly, while the radial location of the hoop stress is different for the upper expansion coefficient data for the more severe thermal gradient when the temperature of the outer wall is only 1000° F., the absolute value of the hoop stress is actually somewhat higher for these values (i.e., 32 ksi versus 19 ksi tension). FIGS. 8 and 9 unequivocally show that, no matter which values of the thermal coefficient of expansion are chosen from FIG. 4, that the hoop stresses within the walls of a zirconia nozzle shell are extremely high when molten steel initially flows through the inner diameter of the nozzle. Hence high hoop or axial stresses are a strong function of the basic change in material properties at 1800° F., and cannot be avoided by choosing a zirconia material having particularly high or low thermal expansion coefficients.

Figure 10:
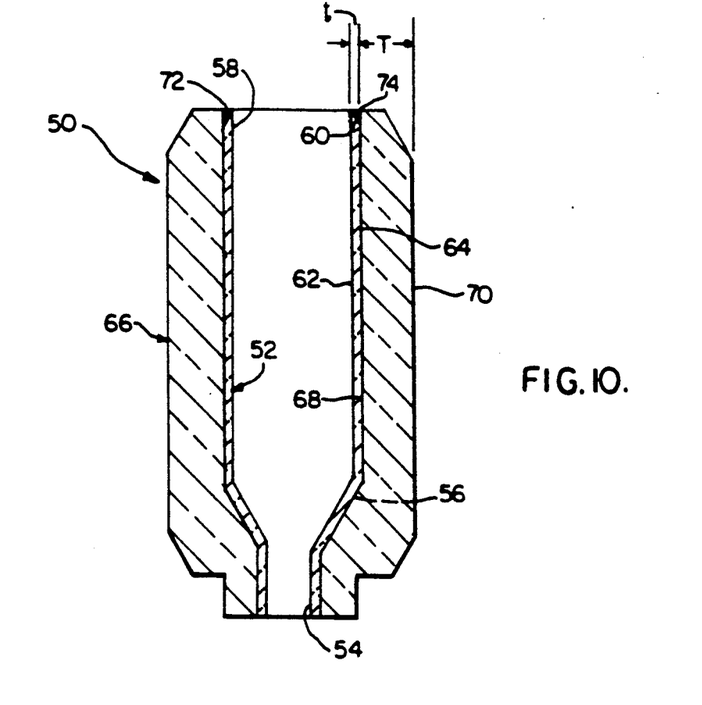
FIG. 10 is a schematic, cross-sectional side view of the preferred embodiment of the composite nozzle assembly of the invention, illustrating how an inner nozzle shell formed from zirconia is closely contained within an outer nozzle shell formed from a ceramic material with superior thermal shock properties such as boron nitride.
Figure 11:
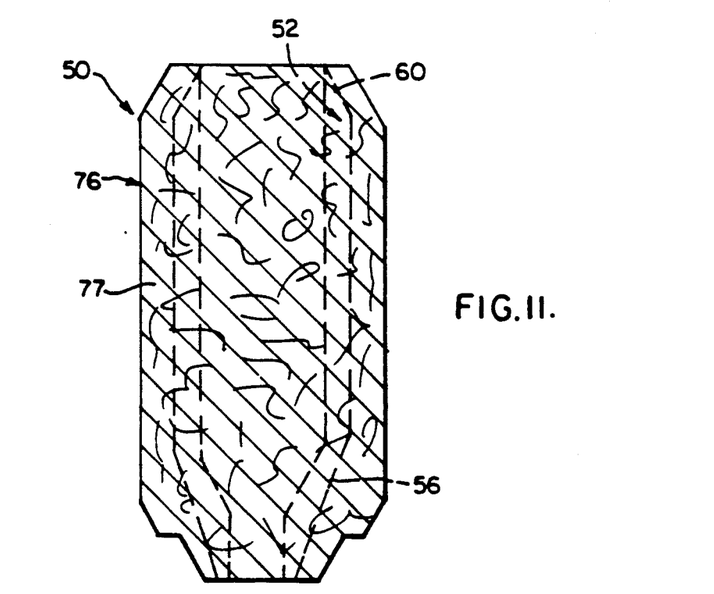
FIG. 11 is a side view of a second embodiment of the invention, wherein a strip of heat resistant fabric formed from fiberglass or mineral fibers is spiral-wound around an inner nozzle shell of zirconia under tension in order to apply a compressive load around the zirconia shell.

FIGS. 10 and 11 illustrate two embodiments of the composite nozzle assembly 50 of the invention that overcomes the aforementioned stress-induced cracking problems associated with prior art zirconia nozzles. With specific reference to FIG. 10, the preferred embodiment of the invention includes an inner nozzle shell 52 formed from zirconia which has substantially thinner walls than the zirconia nozzle shell 26 described with respect to the electromagnetic valve 25. At its bottom, this inner nozzle shell 52 includes a nozzle outlet 54 circumscribed by a tapered bottom section 56. Its top, this same shell 52 includes an nozzle inlet 58 circumscribed by a tapered top section 60. The inner wall 62 of the shell 52 defines a substantially cylindrical flow path for molten steel. The outer wall 64 of the shell 52 is preferably roughened for a purpose which will become evident shortly hereinafter. The embodiment of the composite nozzle assembly 50 illustrated in FIG. 10 further includes an outer nozzle shell 66 formed from a ceramic material which preferably has relatively better tensile strength than zirconia and which further is not afflicted with the same large changes in thermal coefficient of expansion as a function of temperature illustrated in FIG. 4. The ceramic material forming the outer nozzle shell 66 should also have a thermal coefficient of expansion similar to zirconia to minimize stresses at the interface between the inner and outer nozzle shells 52,66. In the instant example, the outer nozzle shell 66 is formed from boron nitride, although any ceramic material which conforms to the aforementioned criteria may be used.

The outer nozzle shell 66 includes an inner wall 68 which is complementary in shape to the outer wall 64 of the inner nozzle shell 52. Preferably, when the inner nozzle shell 52 is assembled into the interior of the outer nozzle shell 66, a thin layer of heat resistant mortar is placed between the outer wall 64 of the inner nozzle shell 52 and the inner wall 68 of the outer nozzle shell 66. Additionally, the inner wall 68 of the outer nozzle shell 66 should be roughened in the same manner as the outer wall 64 of the inner nozzle shell 52. This thin layer of mortar, in combination with the roughened surfaces of the outer and inner walls 64 and 68, tightly secures the two walls together when a flow of molten steel through the nozzle assembly 50 creates heat gradients which result in thermal differential expansion of the two shells 52 and 66. Such tight securement insures that the outer nozzle shell 66 will provide stress-relieving, compressive support for the inner nozzle shell 52. Located near the top of the composite nozzle assembly 50 is an annular space 72 created between the tapered top section 60, and the inner wall 68 of the outer nozzle shell 66. This space 72 is preferably filled with the same kind of heat resistant mortar 74 which should be present in the form of a thin coating between the outer wall 64 and inner wall 68 of the inner and outer nozzles 52 and 66, respectively.

While the relative thickness t of the inner nozzle shell 52 can be anywhere up to 100% of the thickness T of the walls of the outer nozzle shell 66, this thickness t is preferably less than 15% of the thickness T of the outer nozzle shell 66 for two reasons. First, a relatively thinner wall for the inner nozzle shell 52 minimizes the time that this shell is exposed to the severe temperature gradients which result when molten steel is initially poured through the nozzle assembly 50. Secondly, since the tensile strength of the boron nitride that forms the outer nozzle shell 66 is substantially greater than the tensile strength of the zirconia that forms the inner nozzle shell 52, the overall tensile strength of the nozzle assembly 50 is enhanced by making the thickness T of the outer nozzle shell as large as possible relative to the thickness t of the walls of the inner nozzle shell 52. Preferably, the overall diameter of the composite nozzle assembly 50 is no larger than the diameter of a conventional nozzle shell 26.

In operation, when molten steel initially flows past the inner wall 62 of the inner nozzle shell 52, the zirconia forming the walls of the inner shell 52 expands in accordance with whatever particular coefficients of thermal expansion are associated with the specific type of zirconia forming the shell 52. This thermal expansion causes the inner nozzle shell to expand both radially and axially against the inner wall 68 of the outer nozzle shell 66. Because of the presence of mutually roughened surfaces and a thin layer of mortar between the outer wall 64 and inner wall 68 of the inner and outer nozzle shells 52 and 66, the outer nozzle shell 66 immediately applies a compressive load which the applicant computes on the order of approximately 25 ksi in both the radial and axial directions. The application of such a load relieves the tensile stresses within the walls of the inner nozzle shell 52, thereby preventing it from cracking.

The relief of these tensile stresses should prevent the inner nozzle shell 52 from cracking under all circumstances. However, even if it does not, the boron nitride outer nozzle shell 66 will prevent any molten steel from escaping from the composite nozzle assembly 50. Accordingly, the outer nozzle shell 66 not only provides a stress-relieving, compressive load on the inner nozzle shell 52 in both the radial and axial directions; it also provides a safety barrier between the molten steel flowing through the inner nozzle shell 52 and the rest of the electromagnetic valve in the event that the inner shell 52 should crack. The safety barrier provided by the outer nozzle shell 66 advantageously obviates the need for the alumina safety liner 35, which in turn allows the diameter of the induction coil 39 to be made smaller, resulting in reduced power need for the operation of the electromagnetic valve 25.

In the alternate embodiment of the composite nozzle assembly 50 illustrated in FIG. 11, an outer nozzle covering 76 formed from heat resistant fabric strip 77 is provided in lieu of the previously described ceramic outer nozzle shell 66. In this alternate embodiment of the invention, the fabric strip 77 is wrapped under tension in a spiral pattern so that it simultaneously applies both a radial and axial load to the inner nozzle shell 52. Moreover, the fabric strip 77 is tensioned sufficiently around the outer walls of the inner nozzle shell 52 so that an axial and radial load of approximately 25 ksi is achieved. Suitable materials for the fabric strip 77 include fiberglass, or fabric strips woven from mineral fibers, an example of which is Nextrel ® which is available from the Minnesota Mining and Manufacturing Company, located in St. Paul, Minn. Again, the overall diameter of this embodiment is approximately the same as the diameter of a conventional nozzle shell 26 used within an electromagnetic valve 25. Again, the fact that the outer nozzle covering 76 provides a barrier against any molten metal which could flow through any cracks which should occur in the inner nozzle shell 52 allows the removal of the alumina safety liner 35 in such valves 25, and the use of an induction coil 39 having a spiral portion 41 with an advantageously smaller radius.

We claim:

1. A composite nozzle assembly for conducting a flow of molten metal in an electromagnetic valve, comprising an inner nozzle shell formed from an erosion-resistant ceramic material which undergoes tensile stresses of a magnitude sufficient to promote cracking when subjected to the thermal gradient caused when said nozzle shell initially conducts said flow of liquid metal, and a means for applying a compressive load to said inner nozzle shell for reducing said tensile stresses including a layer of electrically non-conductive material disposed around the outside of the inner nozzle shell, wherein said compressive load means applies said load only when said thermal gradient exists between said inner nozzle shell and said layer of material.

2. A composite nozzle assembly as defined in claim 1, wherein said ceramic material that forms said inner nozzle shell is characterized by a decreasing thermal coefficient of expansion above a certain temperature which is included between the maximum and minimum temperatures defining the thermal gradient.

3. A composite nozzle assembly as defined in claim 2, wherein said ceramic material substantially comprises zirconia.

4. A composite nozzle assembly as defined in claim 2, wherein said ceramic material comprises zirconia partially stabilized with MgO.

5. A composite nozzle assembly as defined in claim 1, wherein said means for applying a compressive force includes an outer nozzle shell that contains and closely engages said inner nozzle shell and which is formed from a second ceramic material having superior thermal shock properties than said first ceramic material.

6. A composite nozzle assembly as defined in claim 5, wherein said second ceramic material has a thermal coefficient of expansion about the same as that associated with the first ceramic material to minimize stresses at the interface of said inner and outer shells after thermal steady-state has been attained.

7. A composite nozzle assembly as defined in claim 6, wherein the inner nozzle shell is substantially formed from zirconia, and the outer nozzle shell is substantially formed from boron nitride.

8. A composite nozzle assembly as defined in claim 5, wherein the cross-section of said nozzle assembly is annular, and the thickness of the outer nozzle shell is at least twice that of the thickness of the inner nozzle shell.

9. A composite nozzle assembly for conducting a flow of molten metal containing iron in an electromagnetic valve, comprising an inner nozzle shell formed from a first ceramic material that is erosion-resistant to the flow of molten metal therethrough but which has a thermal coefficient of expansion that decreases above a certain temperature such that said inner nozzle shell undergoes tensile stresses of a magnitude sufficient to promote cracking when subjected to the thermal shock associated with the initial flow of molten metal through said nozzle assembly, and a means for applying a compressive load to said inner nozzle shell for reducing said internal tensile stresses to a level sufficient to prevent said internal cracking, said compressive load means including an outer nozzle shell that contains and closely engages said inner nozzle shell and which is formed from a second ceramic material having superior thermal shock properties than said first ceramic material, and which has a thermal coefficient of expansion about the same as that associated with the first ceramic material to minimize stresses at the interface of said inner and outer shells after thermal steady-state has been attained, and which only applies said compressive load when a thermal gradient exists between said inner nozzle shell and said outer nozzle shell.

10. A composite nozzle assembly as defined in claim 9, wherein said ceramic material substantially comprises zirconia.

11. A composite nozzle assembly as defined in claim 10, wherein said ceramic material comprises zirconia partially stabilized with MgO.

12. A composite nozzle assembly as defined in claim 9, wherein the cross-section of said nozzle assembly is annular, and the thickness of the outer nozzle shell is at least twice that of the thickness of the inner nozzle shell.

13. A composite nozzle assembly as defined in claim 12, wherein the thickness of the inner nozzle shell is less than 15% of the thickness of the outer nozzle shell not only to increase the amount of tensile strength the outer nozzle shell has relative to the inner nozzle shell, but also to decrease the temperature gradient existing between the inner and outer diameters of the inner shell.

14. A composite nozzle assembly as defined in claim 12, wherein the inner nozzle shell is substantially formed from zirconia, and the outer nozzle shell is substantially formed from boron nitride.

15. A composite nozzle assembly for shaping and controlling a flow of molten steel heated to a temperature of about 2800° F. in an electromagnetic valve, comprising a nozzle shell formed from zirconia which has been partially stabilized with MgO, wherein said shell undergoes tensile stresses of a magnitude sufficient to induce cracking when subjected to the thermal gradient associated with the initial flow of said molten steel therethrough, and a means for applying both a circumferential and axial compressive load to said nozzle shell for reducing said tensile stresses to a level sufficient to prevent said internal cracking.

16. A composite nozzle assembly as defined in claim 15, wherein the magnitude of the load applied by the compressive load means partially or totally offsets the thermal tensile stresses generated in the inner nozzle shell.

17. A composite nozzle assembly for conducting a flow of molten metal in an electromagnetic valve, comprising an inner nozzle shell formed from an erosion-resistant ceramic material which undergoes tensile stresses of a magnitude sufficient to promote cracking when subjected to the thermal gradient caused when said nozzle shell initially conducts said flow of liquid metal, and a means for applying a compressive load to said inner nozzle shell for reducing said tensile stresses, wherein said means for applying said compressive force is a strip of flexible, heat resistant material tensionally wrapped around the exterior of the inner nozzle shell.

18. A composite nozzle assembly as defined in claim 17, wherein said strip of flexible, heat resistant material is helically wrapped around the exterior of the inner nozzle shell to apply both a circumferential and an axial compressive force to said nozzle shell.

* * * * *